(12) United States Patent
Kelleher et al.

(10) Patent No.: US 8,552,314 B2
(45) Date of Patent: Oct. 8, 2013

(54) PORTABLE, HAND-HELD WEIGHING APPARATUS WITH THREE INDICATORS

(76) Inventors: Mark Kelleher, Aitkenvale (AU);
Robert Baade, Aitkenvale (AU)

( * ) Notice: Subject to any disclaimer, the term of this patent is extended or adjusted under 35 U.S.C. 154(b) by 523 days.

(21) Appl. No.: 12/919,862

(22) PCT Filed: Feb. 20, 2009

(86) PCT No.: PCT/AU2009/000194
§ 371 (c)(1),
(2), (4) Date: Oct. 12, 2010

(87) PCT Pub. No.: WO2009/105805
PCT Pub. Date: Sep. 3, 2009

(65) Prior Publication Data
US 2011/0031039 A1    Feb. 10, 2011

(30) Foreign Application Priority Data
Feb. 29, 2008    (AU) .................................. 2008200971

(51) Int. Cl.
*G01G 17/04*    (2006.01)
*G01G 3/00*    (2006.01)
*G01G 23/18*    (2006.01)
*G01G 23/28*    (2006.01)
*G01D 13/22*    (2006.01)
*G01D 13/24*    (2006.01)

(52) U.S. Cl.
USPC ......................................... 177/232; 116/293

(58) Field of Classification Search
USPC .................. 177/225–228, 230–233; 116/293
See application file for complete search history.

(56) References Cited

U.S. PATENT DOCUMENTS

| 2,531,124 | A | * | 11/1950 | Hart | 116/293 |
| 2,848,973 | A | * | 8/1958 | Stiens | 116/293 |
| 2,995,106 | A | * | 8/1961 | Granada | 116/293 |
| 3,016,038 | A | * | 1/1962 | Stiens | 116/293 |
| 3,041,997 | A | * | 7/1962 | Hartwell | 116/293 |
| 3,718,198 | A | * | 2/1973 | Hach | 177/232 |
| 4,050,314 | A | * | 9/1977 | Longhetto | 73/715 |
| 4,078,625 | A |   | 3/1978 | Loeb | |
| 4,382,478 | A | * | 5/1983 | Hearn | 177/169 |
| 5,686,704 | A |   | 11/1997 | Simser | |
| 6,148,668 | A | * | 11/2000 | Sieg | 73/296 |
| 6,246,017 | B1 |  | 6/2001 | Yang | 177/148 |
| 6,410,864 | B1 | * | 6/2002 | Kim | 177/148 |
| 7,232,961 | B1 | * | 6/2007 | Godshaw et al. | 177/131 |

FOREIGN PATENT DOCUMENTS

AU    20041000314    7/2004

* cited by examiner

*Primary Examiner* — Randy W Gibson
(74) *Attorney, Agent, or Firm* — Stein IP, LLC

(57) ABSTRACT

A weighing apparatus, the weighing apparatus comprising a weighing portion including means for at least temporarily retaining an item to be weighed thereon, and a measurement portion in communication with the weighing portion, wherein the measurement portion comprises at least two indicators for indicating the weight of the item attached to the weighing apparatus, each of the indicators for indicating the weight of the item in different conditions.

8 Claims, 2 Drawing Sheets

PORTABLE, HAND-HELD WEIGHING APPARATUS WITH THREE INDICATORS

CROSS-REFERENCE TO RELATED APPLICATIONS

This application claims the benefit of PCT International Patent Application No. PCT/AU2009/000194, filed Feb. 20, 2009, and Australian Patent Application No. 2008200971, filed Feb. 29, 2008, in the Australian Patent Office, the disclosures of which are incorporated herein by reference.

BACKGROUND OF THE INVENTION

1. Field of the Invention

The present invention relates to a weighing apparatus. In particular, the present invention related to a portable weighing apparatus for weighing items, such as gas bottles or the like.

2. Description of the Related Art

Gas bottles are used for a large variety of applications in domestic, commercial and industrial settings. Regardless of the application in which bottled gas is being used, it is advantageous to know the amount of gas remaining in a gas bottle so that a user does not, in the middle of an activity, have to change gas bottles or, worse, run out of gas completely.

The most simple method of measuring the amount of gas remaining in a gas bottle is to shake the bottle and estimate the quantity remaining. However, this technique is often extremely inaccurate.

Some attempts have been made to develop devices that measure, with greater accuracy, the quantity of gas in a gas bottle. These devices include a plastic strip adhered to the outer surface of a gas bottle. The level of the gas in the bottle may be determined by pouring boiling water over the strip, causing the strip to change colour.

It is possible to determine the quantity of gas in a gas bottle by weighing the bottle on a set of scales. However, for this technique to work with any accuracy it is necessary to know the weight of the bottle when empty (the tare weight normally marked on the bottle) and then subtract this from the combined weight of the bottle and gas, making this technique slow and cumbersome.

A more sophisticated solution to this problem was disclosed in Australian Innovation Patent No. 2004100314. In this patent, a device was disclosed that could be set to automatically deduct the tare weight of the bottle from the combined weight of the gas and the bottle when a gas bottle was attached to it. However, this device operates as a set of scales, meaning that the weight must be read directly from the scale before the gas bottle is removed, or else the measurement will be lost.

Thus, there would be an advantage if it were possible to provide a weighing apparatus that could measure the quantity of gas in a gas bottle and at least temporarily retain that measurement even when the gas bottle has been removed from the weighing apparatus.

It will be clearly understood that, if a prior art publication is referred to herein, this reference does not constitute an admission that the publication forms part of the common general knowledge in the art in Australia or in any other country.

Throughout this specification, the term "comprising" and its grammatical equivalents shall be taken to have an inclusive meaning unless the context of use indicates otherwise.

SUMMARY OF THE INVENTION

It is an object of the present invention to provide a weighting apparatus which may overcome at least some of the abovementioned disadvantages, or provide a useful or commercial choice.

In one aspect, the invention broadly resides in a weighing apparatus, the weighing apparatus comprising a weighing portion including means for at least temporarily retaining an item to be weighed thereon, and a measurement portion in communication with the weighing portion, wherein the measurement portion comprises at least two indicators for indicating the weight of the item attached to the weighing apparatus, each of the indicators for indicating the weight of the item in different conditions.

The apparatus of the present invention is particularly directed to weighing of gas bottles. The apparatus of the invention is also typically portable, preferably sized to enable the apparatus to be easily held in one hand.

The weighing portion may be of any suitable form to allow the at least temporary retention of an item thereon. Preferably, the item is at least temporarily retained on the weighing portion in such a way that it will not fall off, slide off, or otherwise disengage from the weighing portion during the weighing of the item. To achieve this, the weighing portion may include one or more retention means adapted to retain the item thereon during weighing. The one or more retention means may be of any suitable form, such as, but not limited to, one or more, hooks, slots, recessed, grooves, channels, projections, flanges, lands, shoulders or the like. Preferably, at least a portion of an item to be weighed engages with the one or more retention means in such a way that the item is at least temporarily retained thereon.

The measurement portion may be of any suitable form to allow for the measurement of the weight of the item temporarily retained on the weighing portion. In some embodiments of the invention, the measurement portion may comprise a body with at least two and typically three indicators attached thereto for indicating the weight of the item being weighed.

In some embodiments of the invention, one or mere of the indicators may be set manually prior to weighing an item, such as to set, for instance, an empty (tare) weight or a full weight of the item (bottle, bucket, container etc). Alternatively, one or more of the indicators may be movable relative to the body of the measurement portion, wherein the movement of the one or more indicators relative to the body of the measurement portion may be actuated by placing an item to be weighed on the weighing portion. In a most preferred embodiment of the invention, at least one of the indicators may be set manually prior to weighing an item, and at least one of the indicators may be movable relative to the body of the measurement portion. Alternatively, one or more of the indicators may be reset automatically.

The indicators may be of any suitable form, such as, but not limited to, collars, needles, pointers, rings, or the like, or any combination thereof.

In a preferred embodiment of the invention, the measurement portion comprises three indicators. For instance, in this embodiment of the invention, when the item to be weighed is a gas bottle, one indicator may indicate the weight of the gas bottle when full of gas (the "full" indicator), a further indicator may indicate weight of the gas bottle when empty (the "empty" indicator), and the third indicator may indicate the present weight of the gas bottle (the "weight" indicator). In this way, a user may quickly and easily see how much gas remains in the bottle. In this embodiment of the invention, it is preferred that the weight indicator is located intermediate the full and empty indicators.

In particular, the weight indicator is typically moveable when the weighing portion bears a load. The empty indicator may be moved either before or after the item is first weighed and the full indicator of the apparatus will typically be moved when the item is first weighed. Importantly, the relative position of the weight indicator to the full and empty indicators can give an accurate weight indication, more so than if the weight indicator simply identifies the total weight of the item, and not the weight of the material and the weight of the container, separately as well as their combined weight.

The measurement portion may further comprise a series of indicia indicating a property of the item being weighed. For instance, the series of indicia may indicate weight, volume, density, or any other property of the item. n some embodiments of the invention, the series of indicia may indicate more than one property of the item.

The series of indicia may be printed, engraved or the like onto the surface of the measurement portion, or the measurement portion may be provided with measurement means (such as a printed or stamped panel, electronic screen or the like) mounted thereon.

As previously mentioned, the weighing portion and the measurement portion are in communication with one another. Thus, when an item is retained on the weighing portion, at least one of the indicators of the measurement portion may be actuated, thereby recording the weight (or some other property as desired) of the item.

The actuation of at least one of the indicators may be achieved using any suitable means. Typically however, the weighing portion is coaxial and concentrically located within the measurement portion. Normally, the indicators will be provided concentrically outside the measurement portion with measuring indicia provided on the measurement portion. Typically, the weighing portion will be provided with a means for engaging at least one of the indicators.

According to a particularly preferred embodiment, the measuring portion will be provided with at least one elongate slot extending lengthwise of the measuring portion. The slot will typically not extend completely along the measuring portion. Also preferred is that the weighing portion may be provided with a laterally extending portion which in use will be aligned with the slot in the measuring portion and through that slot, engage at least one of the indicators.

At least one of the indicators will preferably be a ring and be provided with an inwardly extending flange which is also preferably aligned with the slot in use. The ring will typically be frictionally engaged by a portion of the measuring portion to prevent inadvertent movement or movement other than purposive movement.

Weighing an item will preferably move the weighing portion with the laterally extending portion which will preferably engage the inwardly extending flange of the indicator moving it as well. The biasing means will typically act on the weighing portion and/or the measuring portion but not the indicator resulting the indicator being moved during weighing but maintaining its position after the weight is removed.

Preferably, the weighing portion of the apparatus is in communication with biasing means. Any suitable biasing means may be used, such as, but not limited to, a spring. In some embodiments of the invention, the biasing means is connected to both the weighing portion and the measurement portion. Thus, when an item is retained on the weighing portion for weighing, the weighing portion is moved downwardly, thereby causing the biasing means to resist the movement whilst the measurement portion (and, specifically, the indicators) record the weight (or some other property) of the item. Removing the item from the weighing portion allows the biasing means to return the weighing portion to its start position.

In some embodiments of the invention, the biasing means may be at least partially housed within a housing. Preferably, the housing is adapted to be at least partially housed within the measurement portion of the apparatus. Thus, in this embodiment of the invention, the body of the measurement portion of the apparatus may be at least partially hollow. The housing may be provided with one or more engagement means adapted to engage with one or more of the indicators, such that when an item is being weighed, the housing may move relative to the measurement portion. As the housing moves, the one or more engagement means may engage with one or more of the indicators, thereby causing it to move relative to the body of the measurement portion. The one or more engagement means may be of any suitable form, such as, but not limited to, projections, hooks, adhesive portions, loops or the like, or any combination thereof. Preferably, once the one or more indicators has finished moving it will be aligned with the series of indicia in such a way that a user will be able to read the weight (or some other property) of the item being weighed directly by comparing the position of the one or more indicators relative to the indicia.

In some embodiments of the invention, once the item to be weighed has been removed from the weighing portion (i.e. after weighing has taken place), one or more of the indicators may return to its original starting position. Alternatively, in a preferred embodiment of the invention, all of the indicators may remain in their final position (i.e. the position the indicators move to when weighing of the item is taking place) even when the item being weighed has been removed from the weighing portion of the apparatus. In this embodiment of the invention, the fact that the indicators remain in their final position means that a user may record or view the measured weight at their leisure, rather than while the item being weighed is still retained on the weighing portion. This means the user has a greater chance of ensuring that they record the correct weight, reduces the risk of parallax error when reading the indicia, and means that the device may serve to reduce the risk of strain or injury that is associated with other similar devices where a user may be required to bend over, squat or kneel in order to read the weight of the item.

Another advantage of the device of the present invention is that the device can be used to convert a known weight into a weight in a different unit provided that the different unit is marked on the device. If an item of known weight is picked up using the device, then the device will record the weight of that item in whatever units the device is set to.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
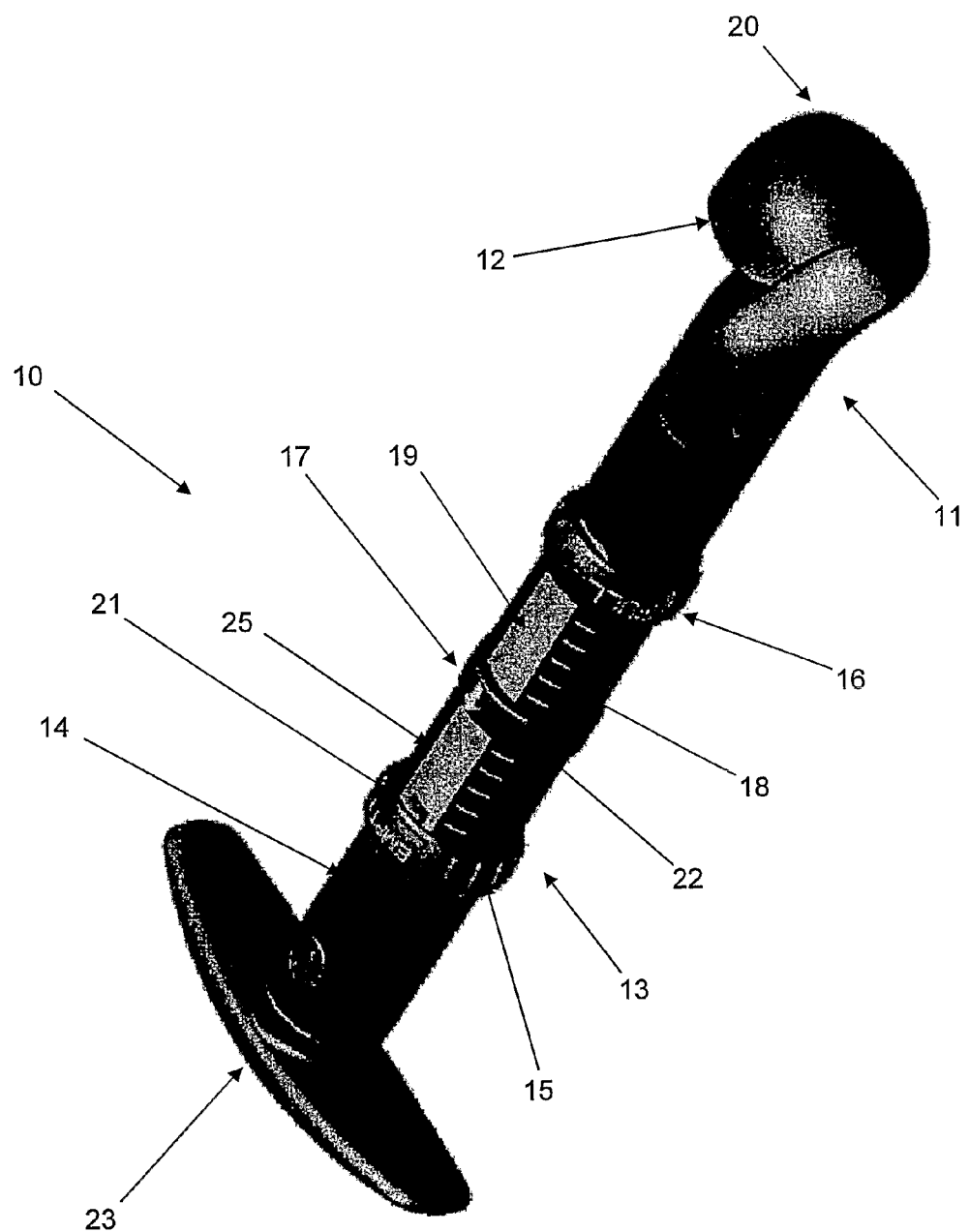
FIG. 1 illustrates a perspective view of a weighing apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

It will be appreciated that the drawings have been provided for the purposes of illustrating preferred embodiments of the present invention and that the invention should not be considered to be limited solely to the features as shown in the drawings.

In FIG. 1 there is shown a weighing apparatus 10 according to an embodiment of the present invention. The weighing apparatus 10 comprises a weighing portion 11 comprising a hook 12 on which an item (not shown) to be weighed may be temporarily retained. The weighing portion 11 is connected to, and in communication with, a measurement portion 13 which comprises a hollow elongate body 14 and three indicators in the form of collars 15, 16, 17. The measurement portion 13 also comprises a series of indicia 18 which form a readable scale that allows a user to accurately read the weight of the item (not shown).

The first collar 15 may be set manually to indicate the empty (tare) weight of the item (not shown) on the indicia 18. Similarly, the second collar 16 may be set manually to indicate the full weight of the item (not shown) on the indicia 18. For ease of use, the first collar 15 and second collar 16 may be provided with the words "Empty" and "Full" to avoid confusion. Alternatively, the first collar 15 and second collar 16 could be provided with symbols or pictures to indicate full or empty. The third collar 17 is located intermediate the first collar 15 and the second collar 16 and is adapted to move relative to the body 14 of the weighing portion 13 when an item (not shown) is being weighed. Movement of the third collar 17 relative to the body 14 of the measurement portion 13 is achieved during weighing, as the weighing portion is connected to biasing means (obscured) which are in turn connected to a housing 19 housed within the body 14 of the measurement portion 13. A window 25 is provided in the body 14 of the measurement portion 13 through which the housing 19 may be seen.

The weight of an item (not shown), when temporarily retained on the hook 12 causes actuation of the biasing means (obscured), which in turn causes the housing 19 to move towards the end 20 of the apparatus 10.

As the housing 19 moves, engagement means in the form of a projection 21 located on the housing 19 engage with the third collar 17, thereby causing the third collar 17 to move relative to the body 14 of the measurement portion 13 and towards the end 20 of the apparatus. The extent of movement of the third collar 17 is determined by the weight of the item (not shown): the heavier the item the closer to the second collar 16 the third collar 17 will move, whereas the lighter the item the closer to the first collar 15 the third collar 17 will remain.

When the item (not shown) is removed from the hook 12, the housing 19 will return to its rest position as shown in FIG. 1. When this occurs, the projection 21 will disengage from the third collar 17 and the third collar 17 will remain in the same position as when the item (not shown) was being weighed. Thus, the user will be able to remove the item (not shown) from the hook 12 but still be able to read the weight of the item at their leisure and with no difficulty.

The third collar 17 is provided with its own indicia in the form of an arrow 22 to indicate the point on the indicia 18 at which the user should read the weight of the item (not shown). Any indicia may be used instead of an arrow: words, symbols, pictures and so on.

The apparatus 10 is further provided with a handle 23 either for a user to hold, or to be suspended from or connected to a support such as a ledge, shelf, hook etc when the apparatus 10 is in use.

Figure 2:
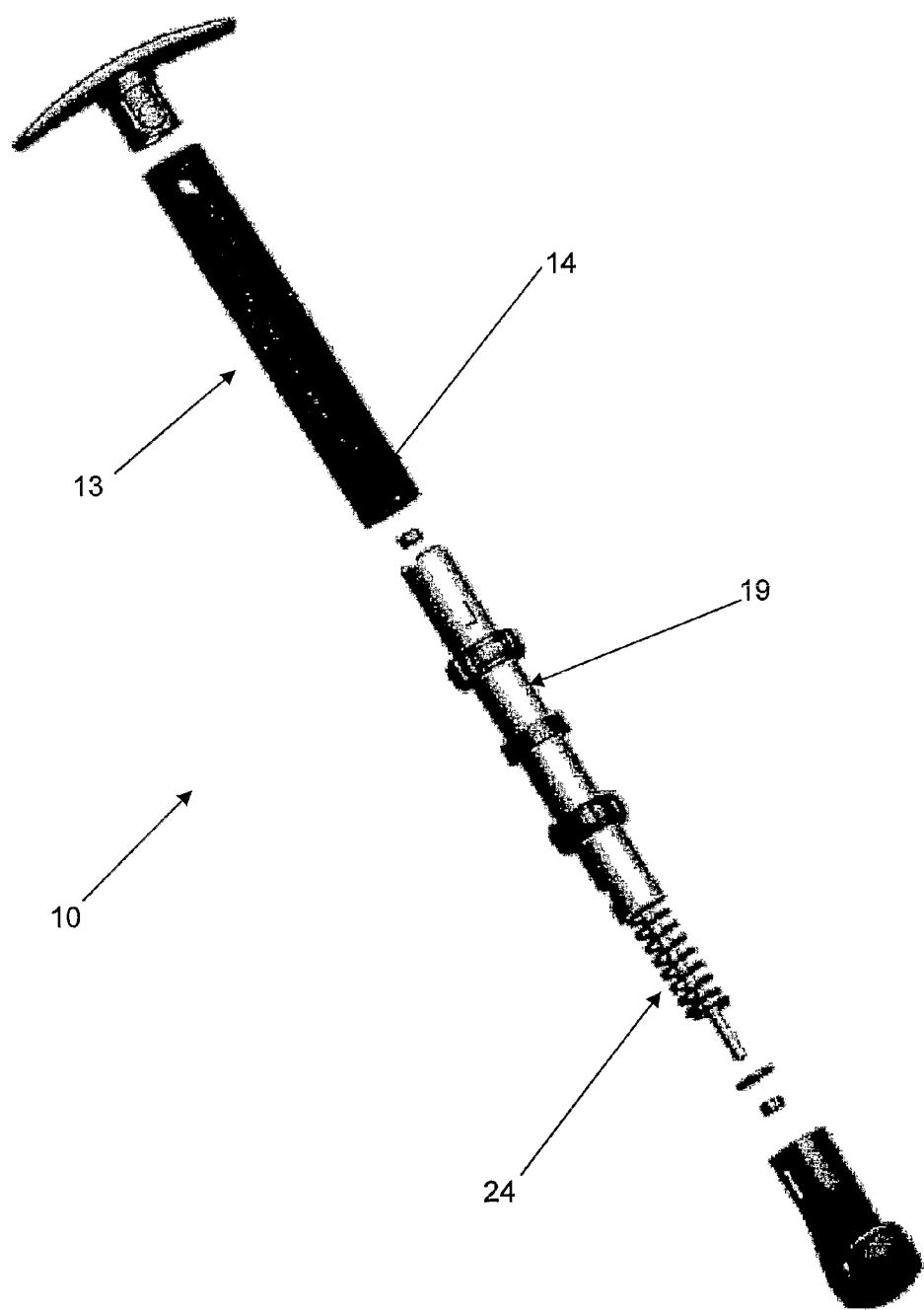
FIG. 2 illustrates an exploded view of a weighing apparatus according to an embodiment of the present invention.

In FIG. 2 an exploded view of the apparatus 10 according to an embodiment of the present invention is shown. In this Figure it may be seen that the weighing portion 11 is adapted for connection to biasing means in the form of a spring 24, the spring being housed within a housing 19 which is in turn housed within the hollow body 14 of the measurement portion 13.

Those skilled in the art will appreciate that the present invention may be susceptible to variations and modifications other than those specifically described. It will be understood that the present invention encompasses all such variations and modifications that fall within its spirit and scope.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A weighing apparatus, the weighing apparatus comprising a weighing portion including means for at least temporarily retaining an item to be weighed thereon, and a measurement portion in communication with the weighing portion, the measurement portion comprising at least three indicators for indicating the weight of the item attached to the weighing apparatus, namely:
   a first indicator for indicating the weight of the item in a full condition,
   a second indicator for indicating the weight of the item in an empty condition, and
   a third indicator for indicating the weight of the item in a partially full condition,
   wherein each of the indicators is adapted for movement relative to the measurement portion, and
   wherein the third indicator is moved relative to the measurement portion when the item to the weighed is at least temporarily retained on the weighing portion, and remains stationary when the item to be weighted is removed from the weighing portion.

2. A weighing apparatus according to claim 1 wherein the weighing portion and the measurement portion are associated with a biasing means.

3. A weighing apparatus according to claim 2 wherein the biasing means comprises a spring.

4. A weighing apparatus according to claim 1 wherein the measurement portion is provided with a series of indicia adapted to convey information regarding a property of the item to be weighed.

5. A weighing apparatus according to claim 1 wherein the at least temporary retention of an item on the weighing portion causes at least one of the indicators to move relative to the measurement portion.

6. A weighing apparatus according to claim 5 wherein the extent of movement of the at least one indicator relative to the measurement portion is determined by the weight of the item to be weighed.

7. A weighing apparatus according to claim 1 wherein the indicators comprise collars.

8. A weighing apparatus according to claim 1, wherein the third indicator is located intermediate the first and the second indicators.

* * * * *